United States Patent [19]
Hodges

[11] Patent Number: 5,547,206
[45] Date of Patent: Aug. 20, 1996

[54] VEHICLE DOLLY APPARATUS

[76] Inventor: Douglas Hodges, 672 W. 12th St. Unit #4, San Pedro, Calif. 90731

[21] Appl. No.: 391,216

[22] Filed: Feb. 21, 1995

Related U.S. Application Data

[63] Continuation of Ser. No. 306,137, Sep. 14, 1994, abandoned.

[51] Int. Cl.$^6$ .................................................. B62B 1/00
[52] U.S. Cl. ................................... 280/47.15; 280/767
[58] Field of Search .................................. 280/767, 762, 280/402, 404, 476.1, 495, 496, 497, 498, 499, 503, 47.131, 47.15; 180/15, 16, 204

[56] References Cited

U.S. PATENT DOCUMENTS

| | | | |
|---|---|---|---|
| 3,317,218 | 5/1967 | Rivolta | 280/767 |
| 3,494,635 | 2/1970 | Denny | 280/402 |
| 3,570,690 | 3/1971 | Wegener | 280/476.1 X |
| 3,635,434 | 1/1972 | Chartier | 280/767 X |
| 4,172,967 | 12/1987 | Farthing | 280/402 X |
| 5,180,177 | 1/1993 | Maki | 280/47.15 |

*Primary Examiner*—Kevin T. Hurley
*Attorney, Agent, or Firm*—Roger A. Marrs

[57] ABSTRACT

A vehicle dolly particularly suited for four-point front wheel drive vehicles and employing a telescopic forward stabilizer bar mounting a pair of swivel casters and a pair of pivotable tube-point plates for attachment at first and second points of the vehicle frame. First and second adjustable rear struts are mounted to the forward stabilizer bar by respective U-joints so as to pivot in both the horizontal and vertical planes. Respective connectors or four-point adjusters are mounted to the respective rear struts and are adjustable along the respective axes of the rear struts for attachment to third and fourth points of the vehicle. Apparatus for adapting the dolly to transport three-point vehicles is also disclosed.

20 Claims, 5 Drawing Sheets

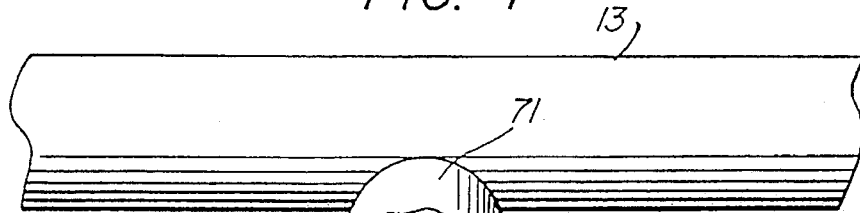
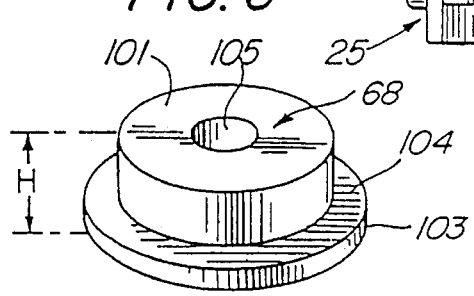
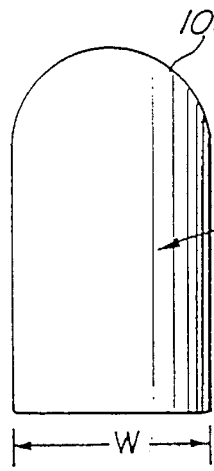
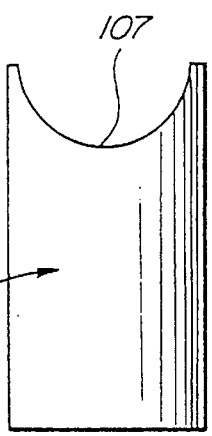
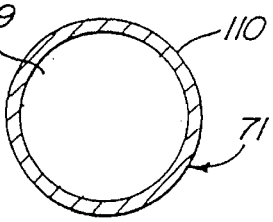
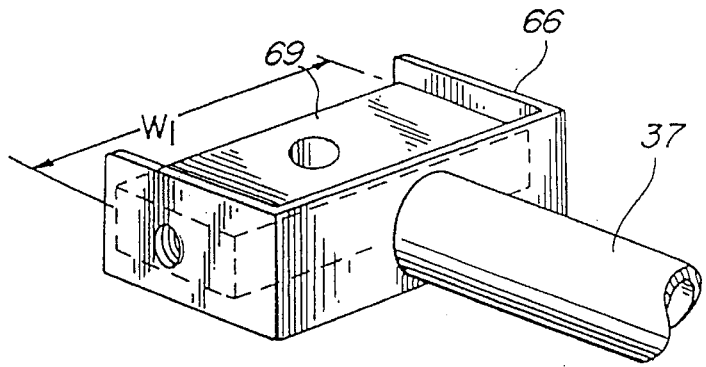
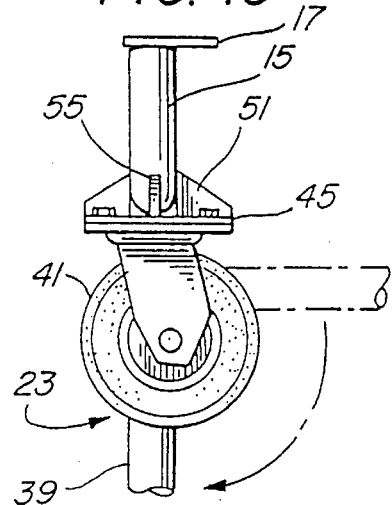

VEHICLE DOLLY APPARATUS

Application is a continuation of Ser. No. 08-306,137 filed Sep. 14, 1994 now abandoned.

BACKGROUND OF THE INVENTION

1. Field of the Invention

The subject invention relates generally to automotive repair equipment and, more particularly, to a dolly for transporting front wheel drive vehicles under repair and, particularly, such vehicles employing a so-called "four-point cradle."

2. Description of Related Art

Presently there are nearly 100 vehicles on the market which employ front wheel drive and an engine/transaxle cradle or subframe, known in the art as a "four-point cradle." Various repair operations on such vehicles require removing the four-point cradle entirely from the vehicle while it is raised off the ground by lifting apparatus in a repair bay. Once the cradle is removed, the vehicle cannot be moved off the lifting apparatus. Thus, the vehicle may be required to remain on the lift apparatus in the repair bay for up to two-and-one-half days while repair operations on vehicle componentry are completed. In such case the repair bay is occupied for that entire period and cannot be used for further repair operations on other vehicles. If parts must be back ordered, the repair bay may be occupied for even longer periods. As may be appreciated, this inefficiency translates into loss of a great deal of money which could be made employing the repair bay for additional repair operations on other vehicles.

Accordingly, the prior art has attempted to provide a dolly apparatus which bolts onto the vehicle to temporarily replace the cradle and to permit the vehicle to be lowered and removed from the repair bay. A known prior art front wheel drive car dolly comprises a pair of swivel casters mounted to an elongated square metal tube. The elongated tube has first and second brackets which are bolted thereto. The brackets permit the bar and casters to be attached to the vehicle's two front engine/transaxle cradle mounting holes by means of several brackets and adapters. Unfortunately, this dolly has been known to collapse under the weight of the vehicle when it encounters a crack in the pavement surface over which the vehicle is being transported. Additionally, the prior art dolly requires the use of various accessory brackets which must be bolted in place in order to adapt the dolly to various front wheel drive vehicles. An effort was also made to employ rear struts with the prior art dolly which were also square metal tubes and had to be bolted on and off the dolly and to the rear cradle bolt holes of a vehicle. In addition to being cumbersome and difficult to use, the prior art dolly with the rear struts bolted in place weighs approximately 96 pounds. Its use is essentially a three-man job.

OBJECTS AND SUMMARY OF THE INVENTION

It is therefore an object of the invention to provide an improved vehicle dolly;

It is another object of the invention to provide an improved vehicle dolly particularly suited for transporting front wheel drive vehicles and, more particularly, those employing a four-point cradle;

It is another object of the invention to provide a vehicle dolly which is readily adaptable with a minimum of labor to fit all front wheel drive four-point cradle vehicles without the necessity of essentially bolting together a new dolly for each vehicle;

It is another object of the invention to provide a vehicle dolly for front wheel drive vehicles of reduced weight;

It is another object of the invention to provide a vehicle dolly of improved strength and durability;

It is a further object of the invention to provide a vehicle dolly for front wheel drive cradle-type vehicles of improved strength and durability; and It is another object of the invention to reduce the amount of manpower required to use a vehicle dolly designed for use with front wheel drive cradle-type vehicles.

These and other objects are achieved according to the invention by providing a vehicle dolly employing a telescopic forward stabilizer bar mounting a pair of swivel casters and a pair of pivotable tube-point plates for attachment at first and second points of the vehicle frame. First and second adjustable rear struts are mounted to the forward stabilizer bar so as to pivot in both the horizontal and vertical planes. Respective means for attaching the rear struts to third and fourth points of the vehicle are mounted to the respective rear struts and are adjustable along the respective axes of the rear struts.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 4 is a partially cross-sectional front view of a U-joint according to the preferred embodiment (front elevational);

FIG. 5 is a perspective view of the round U-joint nut shown in FIG. 4;

FIG. 6 is a front view of the drop tube strut illustrated in FIG. 4;

FIG. 7 is a side view of the strut of FIG. 6;

FIG. 8 is a bottom view of the strut of FIG. 6;

FIG. 9 is a partial side perspective view of the U-joint according to the preferred embodiment;

FIG. 10 is a partial side elevational view of the preferred embodiment;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a lightweight, flexible, durable and highly versatile vehicle dolly.

Figure 1:
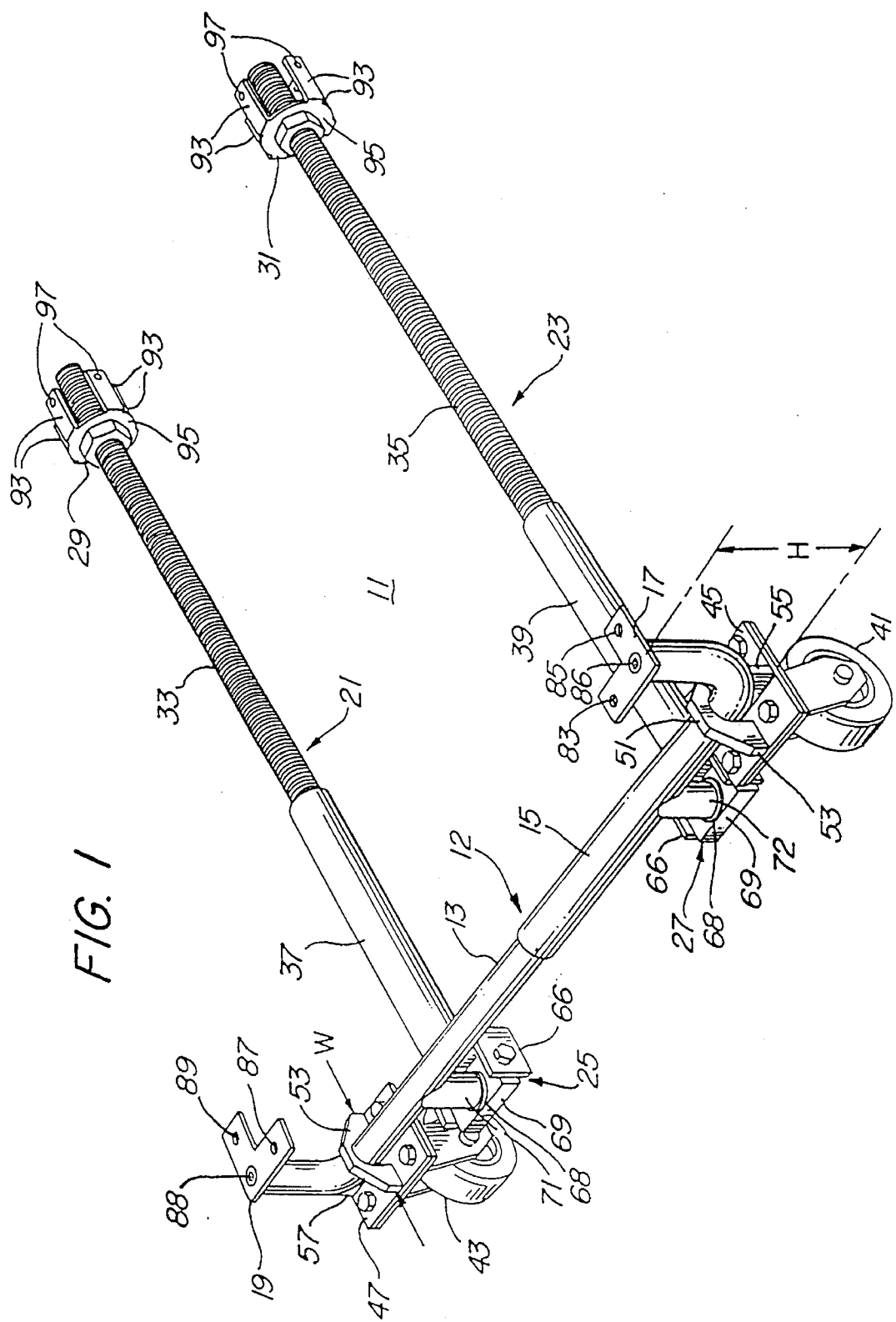
FIG. 1 is a perspective view of the preferred embodiment of the invention.

The preferred vehicle dolly 11 is illustrated in FIG. 1. As shown, the dolly 11 includes a forward stabilizer bar 12, including first and second horizontal tubes 13, 15 and first and second U-joints 25, 27. The U-joints 25, 27 attach first and second rear struts or "drop tubes" 21, 23 to the forward stabilizer bar 12. First and second caster plates 45, 47 are attached to the forward stabilizer bar 12 by respective plate gussets 51, 53 and tube gussets 55, 57. Attachment to a vehicle frame is achieved by bolting the frame to first and second tube point plates 17, 19 pivotally mounted respectively on the first and second tubes 13, 15 and to first and second four-point adjusters 29, 31 which are positionable along the length of the struts 21, 23 with respect to the vehicle.

Figure 2:
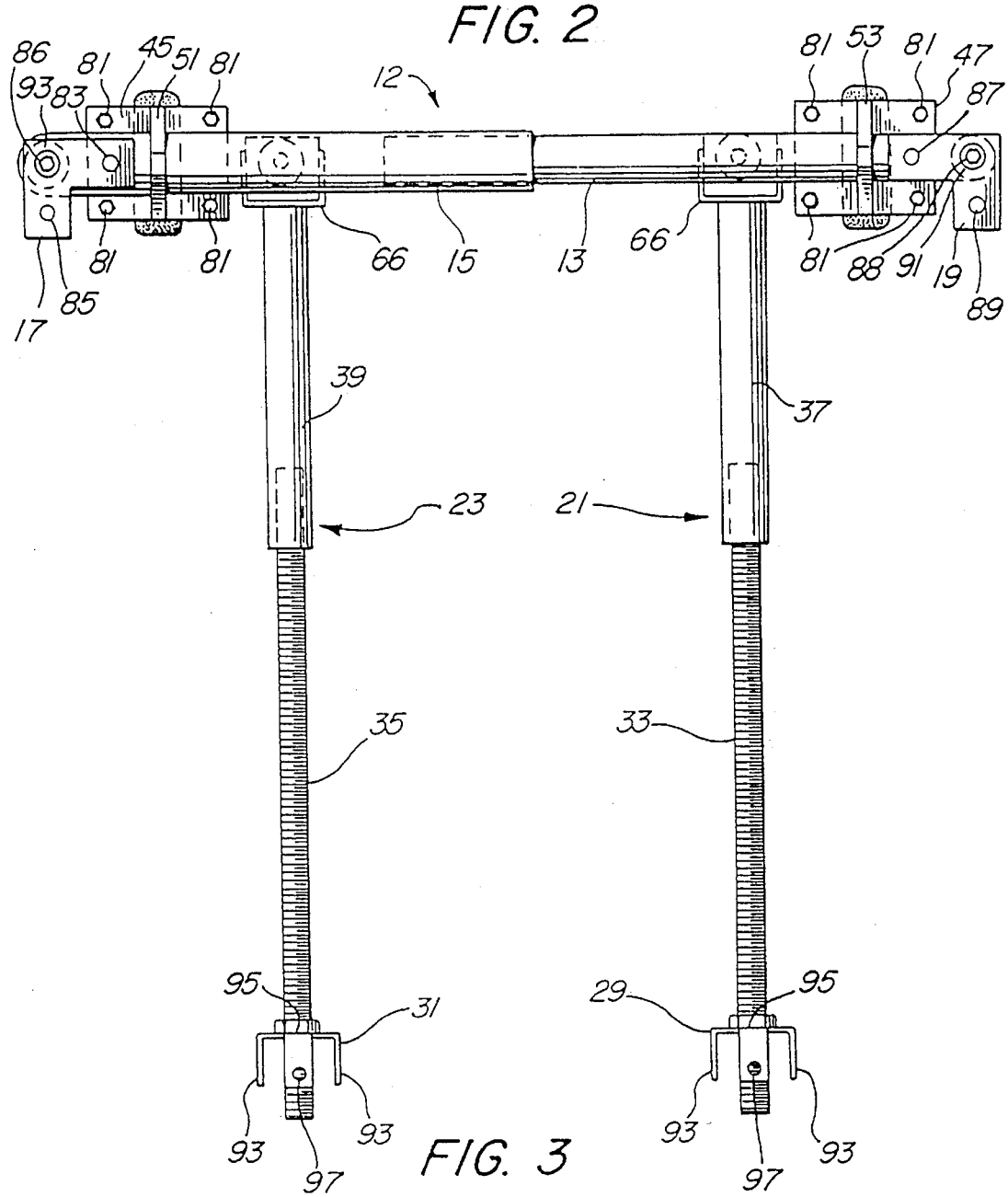
FIG. 2 is a top elevational view of the preferred embodiment of the invention.

Respective casters 41, 43 are mounted to swivel with respect to the caster plates 45, 47. As may be seen in FIG. 2, the first caster plate 45 is rectangular in shape and has four caster bolts 81 mounted in each of its respective four corners. The second caster plate 47 is identically shaped to the first caster plate 45, and also has four caster bolts 81 in respective corners thereof for attaching the caster 43.

The respective inner and outer front stabilizer tubes 13, 15 curve upward 90 degrees at the respective ends thereof. The inner tube 13 of the forward stabilizer bar 12 telescopically and snugly inserts into and out of the outer tube 15 in a free-floating fashion. For this purpose, the inner tube 13 may be a 1¼-inch outside diameter tube telescoping into a 1½-inch tube 15. The tubing is heavy duty, single wall metal tubing 0.110-inch thick in order to provide the desired strength and durability. Various tubing metals could be used, chrome moly tubing being one of them.

At the maximum width of the forward stabilizer bar 12, at least three inches of the inner bar 13 remains positioned within the outer tube 15. This limit is accomplished structurally by spreading the two front stabilizer bars outward to the largest vehicle frame dimension on the current market. The maximum outward length of any vehicle cradle is approximately 44 inches, bolt hole to bolt hole. The front stabilizer bars have been created to allow a 47-inch hole to bolt hole dimension. Minimum overlapping of the tubes 13, 15 is therefore three inches. Once the forward stabilizer bar 12 is adjusted to its desired width by appropriately adjusting the inner tube 13 with respect to the outer tube 15, the two tubes 13, 15 are fixed into position with respect to one another by bolting them to the vehicle cradle A pair of ½-inch flat head Allen hex bolts 86, 88 pivotally mount the respective tube point plates 17, 19 to the forward stabilizer bar 12. As may be further appreciated from FIG. 2, the first tube point plate 17 is a right angle member, while the second plate 19 is a left angle member. Each of the plates 17, 19 is of uniform thickness and has respective first and second bolt holes 83, 85; 87, 89 therein for bolting to the respective front frame locations of a vehicle. These bolt holes 83, 85, 87, 89 may be, for example, 9/16-inch in diameter. The tube point plates 17, 19 are positioned a distance "H" of about 9 inches above the caster plates 45, 47.

As further shown in FIGS. 1 and 4, each U-joint 25, 27 includes a respective drop tube strut holder 71, 72 welded to a round U-joint nut 68, which is, in turn, bolted to a U-joint body 69 by a bolt 63. This structure permits pivoting of the rear struts 21, 23 with respect to the forward stabilizer bar 12 in the horizontal plane. Respective bolts 61, 65 pivotally attach the "U" bracket member 66 of the U-joint to the body 69, permitting downward rotation of each of the respective rear struts 21, 23 in the vertical plane, for example, as illustrated in FIG. 10.

The rear struts 21, 23 include a respective rear strut tube 37, 39 and a respective threaded rod 33, 35. The rear strut tubes 37, 39 are preferably 1¼-inch single wall seamless metal tubing, e.g., chrome moly tubing, of 0.110-inch thickness. The threaded rods 33, 35 may be 33 inches long, respectively, and are fixed in the respective strut tubes 37, 39 by spot welding such that three inches of the one-inch threaded rod 33, 35 remains within the respective strut tubes 37, 39. About 30 inches of the free thread is thus exposed on each rod 33, 35.

Each four-point adjuster 29, 31 is identically constructed and includes four rectangular wings 93 extending from a central hexagonally-sided hub 95. Each four-point adjuster 29, 31 is preferably constructed by stamping it out of a flat sheet of metal and bending over the wings 93 at a right angle with the hexagonal body 95. Prior to bending, respective bolt holes 97 are stamped out or otherwise formed in the wings 93. The four-point adjusters 29, 31 spin along the threaded rods 33, 35, and thus may be adjusted to any position within 1/16-inch resolution along the respective threaded rods 33, 35. In this manner, various vehicle frame lengths may be accommodated by appropriately positioning the four-point adjusters 29, 31 along the threaded rods 33, 35, and then bolting them to the vehicle frame via bolts installed in holes 97. Thus, the four-point adjusters 29, 31 comprise connectors for connecting the rear struts 21, 23 to the vehicle frame.

As may be seen in FIG. 1, the respective tube gussets 55, 57 are solid right triangular members of uniform thickness having a curved contour formed therein for mating with the curved surface of the respective ends of the forward stabilizer tube 12. The tube gussets 55, 57 are also preferably of somewhat differing height and arc in order to accommodate the different-sized tubes 13, 15. The overall width of each of the tube gussets is 2⅝ inches, respectively. The tube gussets 47 are welded in place to the forward stabilizer tube 12 and the caster plates 45, 47.

Figure 3:
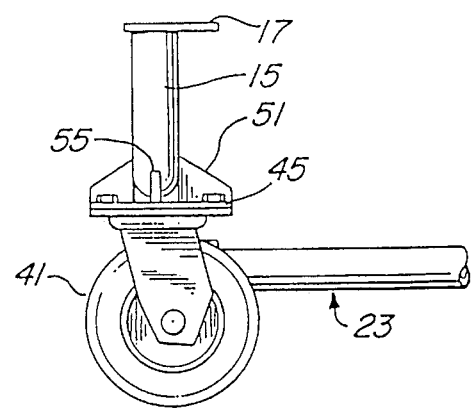
FIG. 3 is a partial side elevational view of the preferred embodiment.

As may be seen, for example, in FIG. 3 and FIG. 1, each plate gusset 51, 53 is a member of uniform thickness having an equilateral triangular upper portion which is notched out to create an oblong circular cross-sectional contour for receiving the forward stabilizer tube 12. The opening in the first plate gusset 51 is sized to accommodate the 1¼-inch tube 13, whereas the opening of gusset 53 is sized to accommodate the 1½-inch 15. Again, the plate gussets 51, 53 are welded securely in position to the forward stabilizer tube 12 and the respective caster plates 45, 47. The overall width "W" of each of the plate gussets is four inches, respectively.

FIGS. 4 through 8 illustrate further details of a U-joint structure, e.g., 25, according to the preferred embodiment. As may be seen in FIG. 5, the round U-joint nut 68 comprises first and second concentric cylinders 101, 103 centered on a tapped center bolt hole 105. The first cylinder 101 is of a lesser diameter than the cylinder 103 so as to create a rim 104 to which the rim 110 of the drop tube strut 71 (FIG. 8) is welded. The bolt 63 threads upwardly into the center tapped hole 105, thereby permitting the U-joint body 69 to pivot with respect to the horizontal tube 13.

As may be seen in FIGS. 6 and 7, the drop tube strut 71 includes a circularly-coped upper end 105 and a semicircular depression 107 which receives and mates with the horizontal tube 13. The second drop tube strut 72 is constructed similarly to the first drop tube strut 71, with the exception that the semicircular depression 107 is appropriately dimensioned to receive the wider 1½-inch diameter tube 15. Both drop tubes 71, 72 are securely welded to the respective horizontal tubes 13, 15, and thereby suspend the U-joints 25, 27.

As seen in FIG. 9, the respective side bolts 61, 63 pivotally mount the "U" member 66 of the U-joint 25 to the U-joint body 69. Dimension "W" of each drop tube strut holder 71, 72 is 1¼ inches. The diameter of cylinder 103 is 1½ inches, the diameter of cylinder 101 is 1¼ inches, and the diameter of the center tapped hole 105 is ½-inch. The width "W$_1$" of the U-joint body 69 is 2½ inches. The body 69 is preferably suspended 2⅜ inches below the tube 13. The overall height "H" of the round U-joint nut is one inch.

As illustrated, for example, in FIG. 10, the strut tubes 37, 39 and threaded rods 33, 35 may be rotated to a vertical position with respect to the horizontal tubes 12 such that the dolly 11 may be simply hung on the wall with the four-point adjusters 29, 31 near the top and the horizontal tube 12 at the bottom. In use, the vehicle dolly 11 may be simply taken off the wall and put in place beneath the raised vehicle with one hand. First and second bolts are then inserted into the vehicle frame through the respective tube point plates 17, 19 and tightened down. In this operation, it is preferable to bolt one tube point plate, e.g., 19, into place. Then the width of the horizontal forward stabilizer bar 12 is adjusted by telescopic movement of the tubes 13, 15 with respect to one another in order to locate the bolt hole of the second tube point plate 17 beneath the desired vehicle frame bolt hole. The tube point plate 17 is then bolted to this hole.

During bolting on of the tube point plates 17, 19, the two strut tubes 37, 39 are hanging down as a result of gravitational force. Thus, after the tube point plates 17, 19 are attached to the vehicle, the first of the struts, e.g., 37, is swung up into place beneath the vehicle frame, and the four-point adjuster, e.g., 29, rotated up or down the threaded shaft 33 as necessary to align the adjuster 29 beneath the desired rear vehicle frame bolt hole location. A bolt is then inserted through the appropriate four-point adjuster bolt hole 97 into the vehicle frame and tightened down. Next, the second rear strut, e.g., 39, is swung into place beneath the vehicle frame. The second four-point adjuster, e.g., 31, is rotated along the threaded rod, e.g., 35, to appropriately place it beneath the corresponding vehicle rear frame bolt hole location, and a bolt is tightened down through the four-point adjuster 31 into the frame to complete the operation. The vehicle may then be lowered onto the service bay floor, where it can then be moved by manual pushing or pulled manually via a separate handle hooked, for example, onto a hole in the U-joint holders 25, 27. During such moving operations, the rear struts 21, 23 stabilize the motion and mobility of the front stabilizer bar 12.

The entire operation just described is a one-man job. The preferred embodiment exhibits a weight of, for example, 49 pounds, and is extremely strong and durable when compared to prior art approaches. The tool of the preferred embodiment is further a universal tool which fits over 39 front wheel drive vehicles currently on the market with simple adjustments described above. It is further designed for use with any front wheel drive vehicle having a four-way cradle. In this connection, the forward stabilizer bar can preferably extend out to 46 inches in width, large enough to accommodate the largest known available vehicle which requires a 43-inch width. The relative flexibility and adjustability built into the device permits it to configure itself to accommodate various bends or twists which may be present in the vehicle frame due to accidents, etc.

Figures 11, 12, 13, 14:
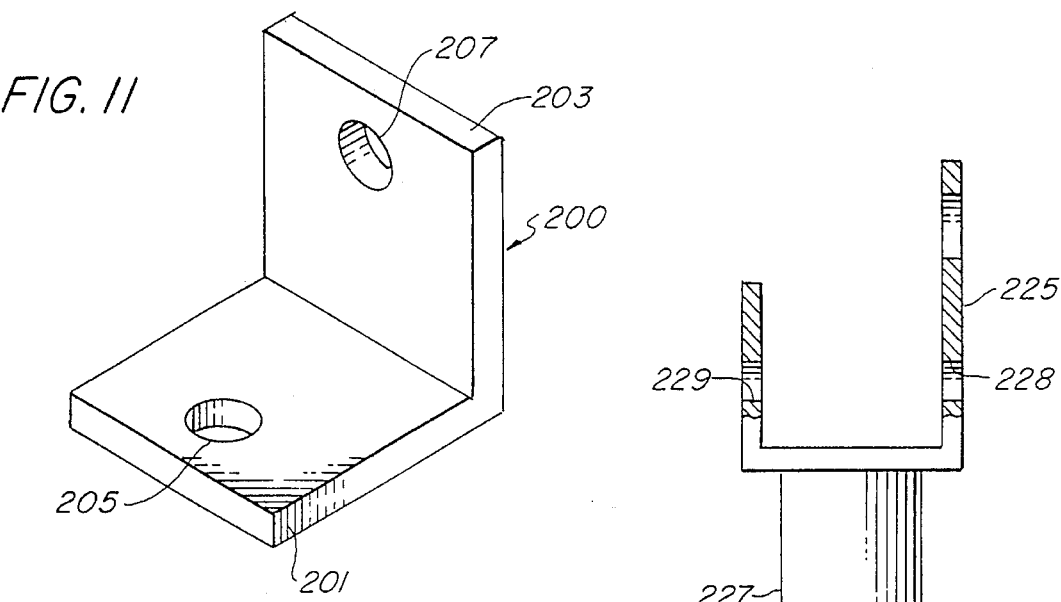
FIG. 11 is a perspective view of a bracket member useful in adapting the preferred four-point dolly for use with three-point vehicles.
FIG. 12 is a front view of a step stabilizer strut adaptor useful in adapting the preferred four-point dolly for use with three-point vehicles.
FIG. 13 is a side view of the adapter of Figure 12.
FIG. 14 is a side view of a "shortie" rear strut useful in adapting the preferred four-point dolly for use with three-point vehicles.

FIGS. 11–14 illustrate apparatus for adapting the preferred four-point dolly 11 of the preferred embodiment to serve as a dolly for three-point vehicles. The apparatus includes three components: an L-bracket 200 (FIG. 11), a slip stabilizer strut adapter 216 (FIGS. 12, 13), and a "shortee" rear strut 225 (FIG. 14).

The L bracket 200 includes first and second sides 203, 201, which meet at a right angle and include respective bolt holes 207, 205. The slip stabilizer strut adaptor 216 includes a section of tubing 215 and an L-bracket 217 welded or otherwise attached to the end of the tube 215. L-bracket 217 has a suitable bolt hole 219.

The slip stabilizer strut 225 is a "shortie" rear strut constructed in the same manner as the rear struts 21, 23 of the preferred four-point dolly, but of a shorter length "L" of 31 inches. The "shortie" rear strut 225 includes a rear strut tube 227, a threaded rod 229, a four-point adjuster 231 (FIG. 15), and a suitable U-member 225 for attaching the rear strut 225 to a U-joint body, such as body 69 of FIG. 4. The "U-member" 225 is shown provided with an extension on one side containing a bolt hole 226 for providing connection to a towing handle (not shown). Holes 228, 229 provide connection to the U-joint body, e.g., 69.

Figure 15:
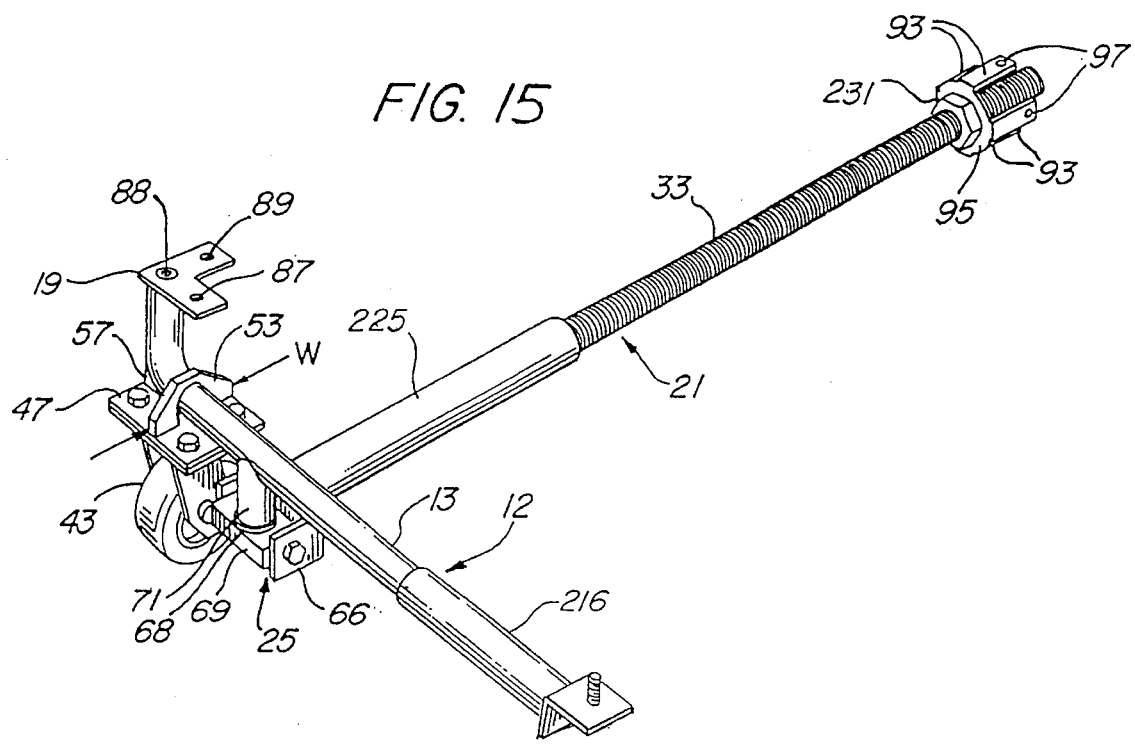
FIG. 15 is a perspective view illustrating assembly of three-point adapter apparatus.
Figure 16:
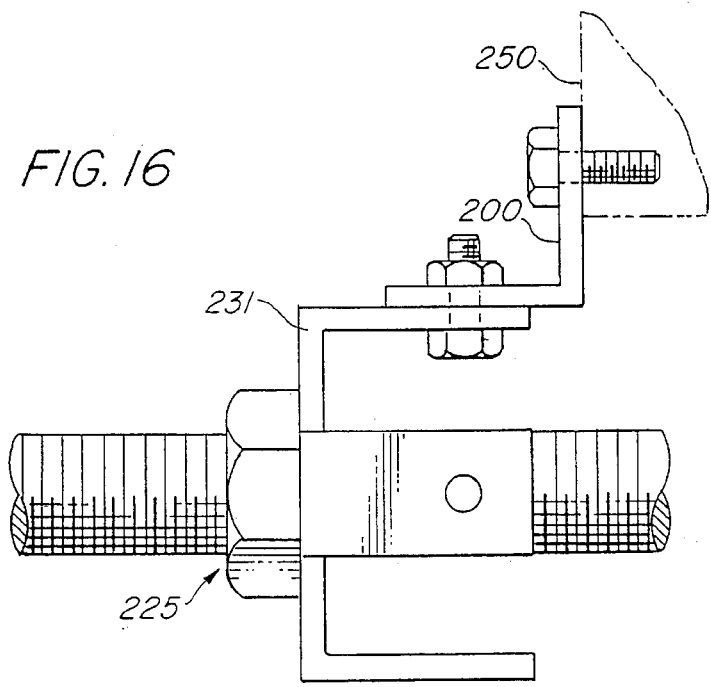
FIG. 16 is a side view illustrating application of the three-point adapter apparatus.

FIGS. 15 and 16 indicate application of the three-point adaptor apparatus in conjunction with parts of the preferred dolly 11. As shown, the slip stabilizer strut adaptor 216 slips over the horizontal tube 13. The "shortie" rear strut 225 bolts to the U-joint body 69, providing it with vertical and horizontal pivoting capabilities. As shown in FIG. 16, the L-bracket 200 connects the four-point adaptor 231 of the strut 225 to the three-point vehicle frame 250. In particular, the L-bracket 200 is bolted to the four-point adjuster 231 and to the vehicle frame 250. Thus, the dolly apparatus 11 of the preferred embodiment may be adapted to serve as a dolly for three-point vehicles.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A vehicle dolly comprising:

a forward stabilizer bar including first and second horizontal tubes telescopically mounted and movable with respect to one another, each of said first and second horizontal tubes curving upward at a respective end thereof;

first and second tube point plate means pivotally attached respectively to said first and second horizontal tubes for connection to a vehicle;

caster means for providing mobility to said forward stabilizer bar;

first and second rear struts;

means for mounting each of said first and second rear struts to said forward stabilizer bar so as to provide pivotal movement of each said rear strut in the horizontal plane and rotation of each said rear strut in the vertical plane; and means rotatably positionable along said rear struts for establishing third and fourth connections to said vehicle frame.

2. The dolly of claim 1 wherein each said tube point plate means pivots in a horizontal plane.

3. The dolly of claim 2 wherein said first tube point plate comprises a right angle member and said second tube point plate comprises a left angle member.

4. The dolly of claim 1 wherein said means for mounting comprises a first U-joint connected to said first rear strut and a second U-joint connected to said second rear strut, said first and second U-joints being pivotally mounted to said forward stabilizer bar.

5. The dolly of claim 3 wherein said means for mounting comprises a first U-joint connected to said first rear strut and a second U-joint connected to said second rear strut, said first and second U-joints being pivotally mounted to said forward stabilizer bar.

6. The dolly of claim 5 wherein each said U-joint comprises a drop tube strut holder rigidly attached to a U-joint nut, said nut being pivotally mounted to a U-joint body and a U-bracket member mounted to pivot up and down and attached to a respective strut.

7. The dolly of claim 1 wherein said struts each have a threaded portion thereon and wherein said means positionable along said struts comprises first and second adjustment members having a plurality of wings mounted about a central hub, said hub being threadably mounted on a respective strut.

8. The dolly of claim 7 wherein said plurality is four.

9. The dolly of claim 4 wherein said rear struts each have a threaded portion thereon and wherein said means positionable along said rear struts comprises first and second adjustment members having a plurality of wings mounted about a central hub, said hub being threadably mounted on a respective strut.

10. The dolly of claim 9 wherein said plurality is four.

11. The dolly of claim 8 wherein said wings are rectangular and said hub is hexagonal.

12. The dolly of claim 11 wherein said rear struts pivot so as to permit hanging said dolly on a wall.

13. Dolly apparatus for attachment to first, second, third, and fourth attachment points of a vehicle comprising:

first means for attachment to the first and second points and linearly extendable along a horizontal axis positioned with respect to the first and second points for adjusting to the location of said first and second points; and second means for enabling attachment to the third and fourth points and providing first and second connectors adjustable along parallel axes perpendicular to said horizontal axis for adjusting to the location of and establishing connection with said third and fourth points; and second means for attachment comprises first and second rear struts each having an attachment member means positionable by rotation along their respective lengths.

14. The dolly of claim 13 wherein each attachment member means comprises an adjuster member having a plurality of wings extending from a central hub, said hub being threadably mounted on the respective strut.

15. The dolly of claim 14 wherein the number of said wings is four.

16. The dolly of claim 15 wherein said wings are rectangular and said hub is hexagonal.

17. The dolly of claim 13 wherein said rear struts pivot to permit hanging on a wall.

18. Vehicle dolly apparatus comprising:

a forward stabilizer bar including first and second horizontal tubes telescopically mounted and movable with respect to one another, each of said first and second horizontal tubes curving upward at a respective end thereof;

first and second tube point plates pivotally attached respectively to said first and second horizontal tubes;

first and second rear struts, each having an axis perpendicular to said stabilizer bar;

first and second U-joint pivotally mounting each of said first and second rear struts to said forward stabilizer bar so as to provide pivotal movement of each said rear strut in a horizontal plane and further rotatably mounting said first and second rear struts with respect to said stabilizer bar so as to provide rotation of each said rear strut in a vertical plane; and first and second connectors mounted on the first and second rear struts, respectively, and positioned along the respective axis thereof.

19. Adapter apparatus for converting a four-point dolly apparatus to serve as a dolly for three-point vehicles comprising:

a rear strut member means having a connector adjustable along the length thereof for attachment to a part of said four-point dolly apparatus;

bracket means for connecting said connector to the frame of a three-point vehicle; and a stabilizer bar means for attachment to a horizontal stabilizer bar of said four-point dolly apparatus.

20. Dolly apparatus for attachment to first, second, third, and fourth attachment points of a vehicle comprising:

first means for attachment to the first and second points and linearly extendable along a horizontal axis positioned with respect to the first and second points for adjusting to the location of said first and second points; and second means for enabling attachment to the third and fourth points and providing first and second connectors adjustable along parallel axes perpendicular to said horizontal axis for adjusting to the location of and establishing connection with said third and fourth points;

means providing mobility to said first means for attachment and wherein said second means stabilizes the mobility of the first means for attachment;

said first attachment means comprises a telescoping horizontal bar; and said bar turns up at respective ends thereof and has first and second plate means pivotally mounted thereto for attaching to said first and second points.

* * * * *